US011334985B2

(12) United States Patent
Ventimiglia

(10) Patent No.: US 11,334,985 B2
(45) Date of Patent: May 17, 2022

(54) SYSTEM AND METHOD FOR SHARED VEHICLE CLEANLINESS DETECTION

(71) Applicant: Robert Bosch GmbH, Stuttgart (DE)

(72) Inventor: Philip Ventimiglia, Northville, MI (US)

(73) Assignee: Robert Bosch GmbH, Stuttgart (DE)

(*) Notice: Subject to any disclaimer, the term of this patent is extended or adjusted under 35 U.S.C. 154(b) by 124 days.

(21) Appl. No.: 16/663,496

(22) Filed: Oct. 25, 2019

(65) Prior Publication Data
US 2021/0125322 A1 Apr. 29, 2021

(51) Int. Cl.
*G06T 7/00* (2017.01)
*G07C 5/08* (2006.01)
*G06T 7/11* (2017.01)
*G06K 9/00* (2022.01)
*G06V 20/59* (2022.01)

(52) U.S. Cl.
CPC ............ *G06T 7/001* (2013.01); *G06T 7/0002* (2013.01); *G06T 7/11* (2017.01); *G06V 20/59* (2022.01); *G07C 5/0825* (2013.01); *G06T 2207/30268* (2013.01)

(58) Field of Classification Search
None
See application file for complete search history.

(56) References Cited

U.S. PATENT DOCUMENTS

| 10,290,158 | B2 | 5/2019 | Jales Costa et al. |
| 10,303,961 | B1* | 5/2019 | Stoffel .................... B60Q 3/76 |
| 10,304,165 | B2 | 5/2019 | Tokatyan |
| 10,762,540 | B1* | 9/2020 | Price .................... G06K 9/4671 |
| 2018/0307926 | A1* | 10/2018 | Tokatyan ........... G06K 9/00771 |
| 2018/0330475 | A1* | 11/2018 | Tokatyan ........... G06K 9/00832 |

(Continued)

FOREIGN PATENT DOCUMENTS

| CN | 108109041 A | 6/2018 |
| DE | 102013001332 A1 | 7/2014 |
| KR | 102005956 B1 | 7/2019 |

OTHER PUBLICATIONS

Jayawickrama, Nilusha. "Detecting trash and valuables with machine vision in passenger vehicles." (2020). (Year: 2020).*

(Continued)

*Primary Examiner* — Emily C Terrell
*Assistant Examiner* — Nathan J Bloom
(74) *Attorney, Agent, or Firm* — Maginot, Moore & Beck LLP

(57) ABSTRACT

A method of operating a vehicle including a cabin having a plurality of interior segments, includes generating image data for each interior segment of the plurality of interior segments with an imaging device located within the cabin. The method further includes processing the generated image data to generate score data including a plurality of scores with a controller operably connected to the imaging device, each score of the plurality of scores corresponding to one of the interior segments of the plurality of interior segments, and combining the generated scores into a single vehicle cleanliness score. The method also includes generating availability data indicating if the vehicle is available or unavailable based on a comparison of the cleanliness score to a cleanliness threshold, and removing the vehicle from service based on the availability data.

14 Claims, 8 Drawing Sheets

(56) References Cited

U.S. PATENT DOCUMENTS

| | | | |
|---|---|---|---|
| 2018/0364728 A1* | 12/2018 | Yaldo | G05D 1/0088 |
| 2019/0197325 A1* | 6/2019 | Reiley | G08B 21/24 |
| 2019/0206223 A1* | 7/2019 | Hwang | G08B 25/08 |
| 2020/0218893 A1* | 7/2020 | Fujisawa | H04N 5/2257 |
| 2020/0226858 A1* | 7/2020 | Fujisawa | G06T 7/254 |
| 2021/0031730 A1* | 2/2021 | Nakano | G06Q 10/06 |

OTHER PUBLICATIONS

Clean AI, available at http://www.cleanai.com, available at least as early as Aug. 2019 (1 page).

* cited by examiner

SYSTEM AND METHOD FOR SHARED VEHICLE CLEANLINESS DETECTION

FIELD

This disclosure relates to the field of shared mobility and, in particular, to using computer vision to determine the relative cleanliness of a cabin of a vehicle.

BACKGROUND

Shared mobility refers to the shared use of a vehicle, bicycle, or other transportation mode. In the case of a shared vehicle, a user is provided with a vehicle on an as-needed basis. For example, according to a roundtrip model, the user selects a vehicle from an initial location, drives the vehicle to a destination, and then returns the vehicle to the initial location. According to a one-way model, the user selects a vehicle from an initial location, drives the vehicle to a destination, and then leaves the vehicle at the location of the destination. Many other models for shared vehicle usage exist.

A vehicle in a shared vehicle program is exposed to many users while in service. Some users leave the vehicle interior in a generally clean state, while other users leave the vehicle interior in a dirty condition, either accidentally or intentionally. Moreover, even when utilized by conscientious customers, shared vehicle interiors tend to become dirty gradually over time, much in the same way that a non-shared vehicle (i.e. a personal vehicle) interior gradually becomes dirty or soiled.

When the operator of a personal vehicle notices that the vehicle interior has become unacceptably dirty, the operator schedules a vehicle cleaning or cleans the vehicle interior themselves. With a shared vehicle, however, the operators/users of the vehicle are typically not responsible for ensuring that the vehicle is in a clean condition. Instead, representatives of a mobility company are responsible for ensuring that the vehicle interior is in a clean condition. Problematically, the representatives are remote from the shared vehicle, thereby making an in-person visual inspection of the vehicle time consuming and expensive.

For at least the above reasons, further developments in the area of shared mobility are desired to optimize the process used by mobility providers in determining the cleanliness state of shared vehicle interiors.

SUMMARY

According to an exemplary embodiment of the disclosure, a method is for operating a vehicle including a cabin having a plurality of interior segments. The method includes generating image data for each interior segment of the plurality of interior segments with an imaging device located within the cabin. The method further includes processing the generated image data to generate score data including a plurality of scores with a controller operably connected to the imaging device, each score of the plurality of scores corresponding to one of the interior segments of the plurality of interior segments, and combining the generated scores into a single vehicle cleanliness score. The method also includes generating availability data indicating if the vehicle is available or unavailable based on a comparison of the cleanliness score to a cleanliness threshold, and removing the vehicle from service when the availability data indicates that the vehicle is unavailable.

According to another exemplary embodiment of the disclosure, an apparatus is for monitoring a cabin of a vehicle, the cabin including a plurality of interior segments. The apparatus includes an imaging device and a controller. The imaging device is located within the cabin and is configured to generate image data for each interior segment of the plurality of interior segments. The controller is operably connected to the imaging device. The controller is configured to process the generated image data to generate score data including a plurality of scores, each score of the plurality of scores corresponding to one of the interior segments of the plurality of interior segments, and to combine the generated scores into a single vehicle cleanliness score. The controller is further configured to generate availability data indicating if the vehicle is available or unavailable based on a comparison of the cleanliness score to a cleanliness threshold, and to remove the vehicle from shared vehicle service when the availability data indicates that the vehicle is unavailable.

BRIEF DESCRIPTION OF THE FIGURES

The above-described features and advantages, as well as others, should become more readily apparent to those of ordinary skill in the art by reference to the following detailed description and the accompanying figures in which.

DETAILED DESCRIPTION

Figure 1:
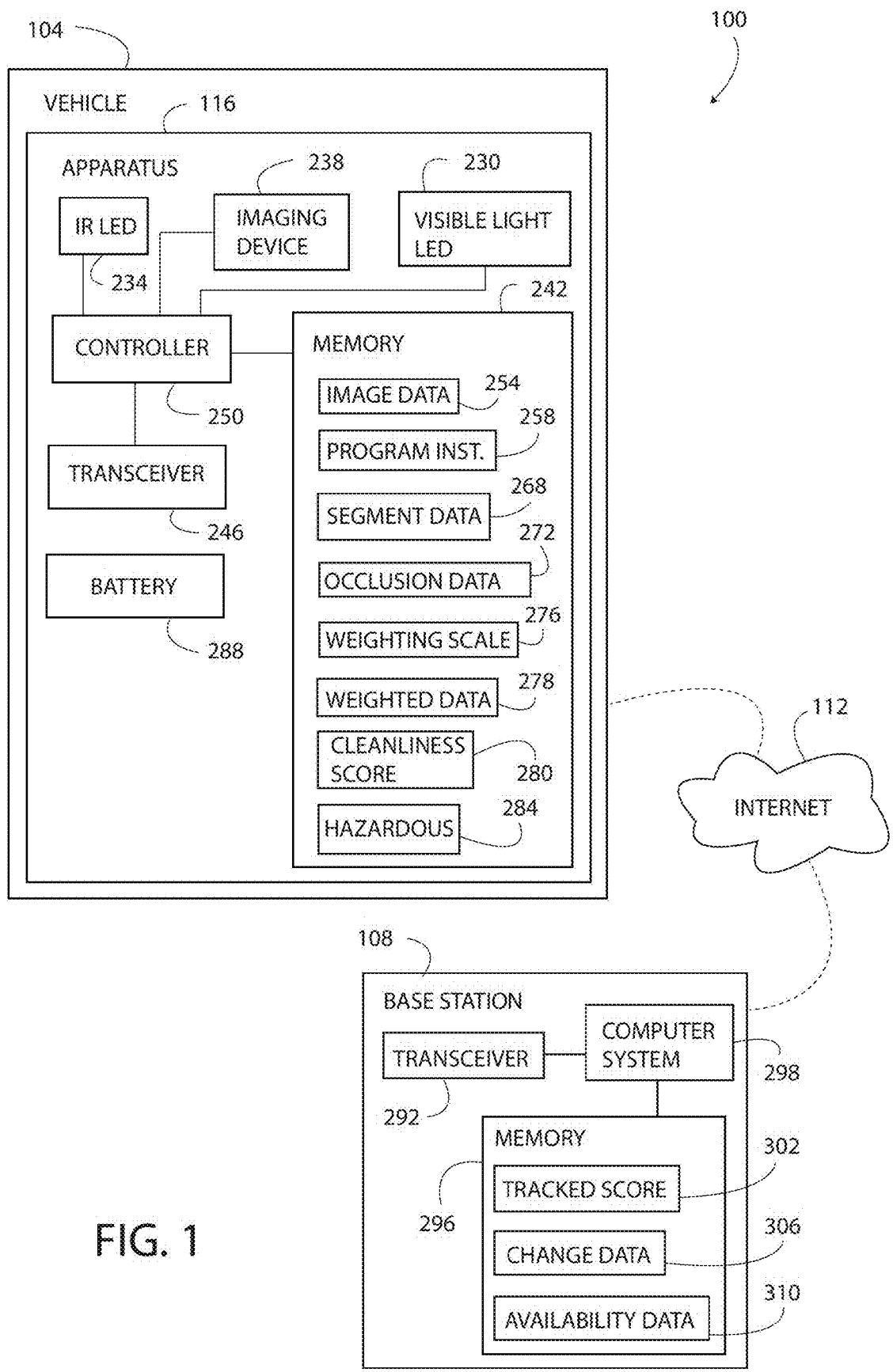
FIG. 1 is a block diagram of a shared vehicle mobility system including a vehicle and a base station, the vehicle having an apparatus for automatically monitoring a cleanliness of the vehicle.

For the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

Aspects of the disclosure are disclosed in the accompanying description. Alternate embodiments of the disclosure and their equivalents may be devised without parting from the spirit or scope of the disclosure. It should be noted that any discussion herein regarding "one embodiment," "an embodiment," "an exemplary embodiment," and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

For the purposes of this disclosure, the phrase "A and/or B" means (A), (B), or (A and B). For the purposes of the disclosure, the phrase "A, B, and/or C" means (A), (B), (C), (A and B), (A and C), (B and C), or (A, B and C).

The terms "comprising," "including," "having," and the like, as used with respect to embodiments of the disclosure, are synonymous.

As shown in FIG. 1, a shared vehicle mobility system 100 includes a vehicle 104 and a base station 108 that are in electronic wireless communication with the Internet 112. The vehicle 104 includes an apparatus 116 for automatically monitoring a cleanliness level of an interior of the vehicle 104. The base station 108 processes data generated by the apparatus 116 to determine when the vehicle 104 should be removed from service for inspection or for cleaning. The apparatus 116 also determines which of the multiple users of the vehicle 104 is responsible for significant changes to the cleanliness level, so that a mobility company can take appropriate measures, such as assessing a cleaning fee against the user. Each element of the shared mobility system 100 is described below.

The exemplary vehicle 104, in one embodiment, is a shared vehicle 104 that may be occupant controlled (i.e. levels zero through four autonomous control) or fully autonomously controlled (i.e. level five autonomous control). In other embodiments, the vehicle 104 is a rental car, a shuttle, a limousine, a corporate vehicle, a livery vehicle, a taxi, a personal vehicle, or a robo-taxi. The vehicle 104 is any vehicle that carries human occupants. The vehicle 104 may be included in a fleet of shared vehicles 104, which includes a plurality of the vehicles 104.

Figure 2:
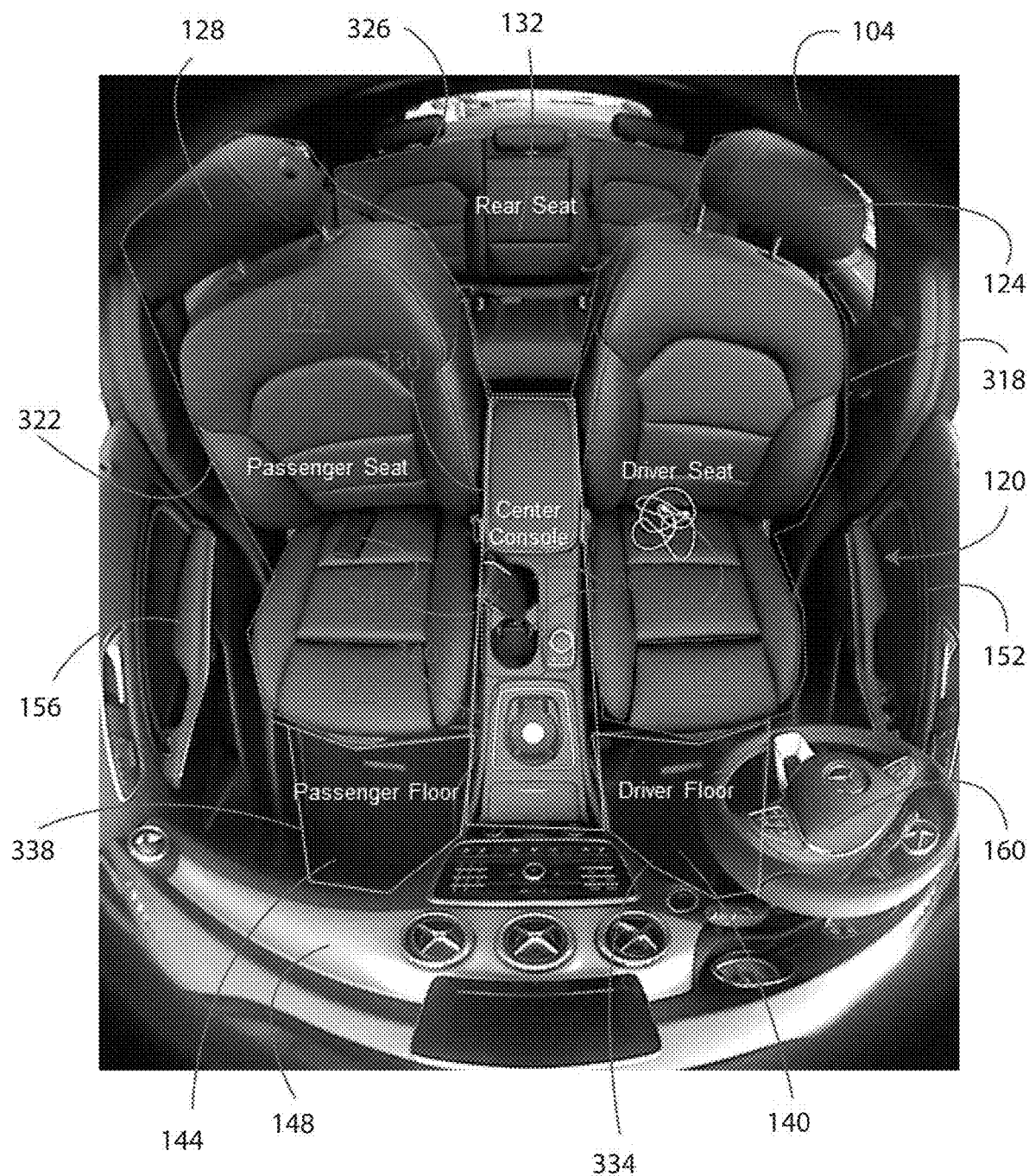
FIG. 2 depicts a cabin of the vehicle as imaged by an imaging device of the apparatus of FIG. 1.

As shown in FIG. 2, the vehicle 104 is a part of a car-sharing program and is at least partially operator controlled. The apparatus 116 is not shown in FIG. 2, because the view provided by FIG. 2 is generated by an imaging device 238 of the apparatus 116. The vehicle 104 includes an interior vehicle cabin 120 having a driver seat 124, a passenger seat 128, rear seats 132, a center console 136, a driver floor 140, a passenger floor 144, a dashboard 148, a driver door 152, a passenger door 156, and a steering wheel 160. The driver seat 124 includes a seat bottom 164 and a seat back 168. The driver seat 124 is movable within the cabin 120 relative to the apparatus 116 to accommodate drivers, users, and operators of different sizes. The passenger seat 128 includes a seat bottom 172 and a seat back 176. The passenger seat 128 is also movable within the cabin 120 relative to the apparatus 116 to accommodate users and operators of different sizes. The rear seats 132 are typically located in a fixed position relative to the apparatus 116.

The driver floor 140 is located in front of the seat bottom 164 of the driver seat 124 and is a region in which the driver places their feet while operating the vehicle 104. The passenger floor 144 is located in front of the seat bottom 172 of the passenger seat 128 and is a region in which the passenger places their feet while riding in vehicle 104.

The center console 136 is located between the driver seat 124 and the passenger seat 128. The center console 136 provides a space for the user's arm to rest while riding in the vehicle 104. Moreover, in some embodiments, the center console 136 includes or is located near, at least one cup holder 188. The exemplary cabin 120 includes two of the cup holders 188.

The dashboard 148 is located at the front of the vehicle 104 and includes instruments and controls for operating and/or interacting with the vehicle 104. The steering wheel 160 extends from the dashboard 148 for controlling a direction of movement of the vehicle 104. The driver door 152 is located near the driver seat 124, and the passenger door 156 is located near the passenger seat 128.

Figure 3:
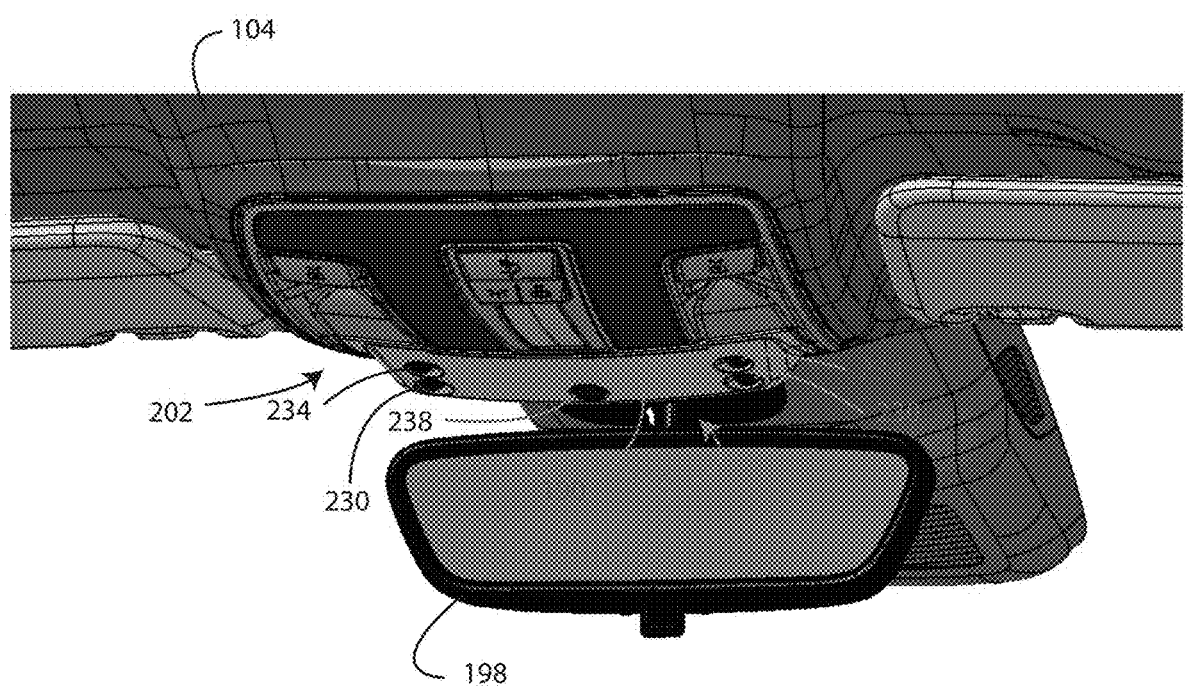
FIG. 3 depicts the apparatus as installed in the vehicle of FIG. 1.

As shown in FIG. 3, the apparatus 116 includes a housing 190 located in an overhead console 194 of the vehicle 104 near a rearview mirror 198 of the vehicle 104. Specifically, in one embodiment, the apparatus 116 is retrofitted into an eyeglasses holder 202 of the vehicle 104 by removing a cover (not shown) of the eyeglasses holder 202 and inserting the housing 190 of the apparatus 116 into the corresponding opening of the eyeglasses holder 202. In one embodiment, no electrical connection between the apparatus 116 and the vehicle 104 is made, such that the apparatus 116 is electrically isolated from the vehicle 104 and operates independently of a power system of the vehicle 104.

With reference again to FIG. 1, the apparatus 116 includes at least one visible light device 230, at least one infrared light device 234, an imaging device 238, a memory 242, and a transceiver 246 each operably connected to a controller 250. The visible light device 230, in one embodiment, is a white light emitting diode ("LED"), configured to emit light in the visible spectrum. In another embodiment, the visible light device 230 is any lighting device that emits light in the visible spectrum, such as an incandescent bulb or a fluorescent light source.

The infrared light device 234, in one embodiment, is an infrared ("IR") LED, configured to emit light in the infrared spectrum. In another embodiment, the IR light device 234 is any lighting device that emits light in the IR spectrum, such as an incandescent bulb or a fluorescent light source.

The imaging device 238 is a digital imaging device or camera configured to generate image data 254 of the cabin 120 of the vehicle 104. An exemplary field of view of the imaging device 238 is shown in FIG. 2. The field of view of the imaging device 238 includes at least the driver seat 124, the passenger seat 128, the rear seats 132, the center console 136, the driver floor 140, and the passenger floor 144. Additionally, the field of view of the imaging device 238 may also include at least portions of the dashboard 148, the driver door 152, the passenger door 156, and the steering wheel 160. In the exemplary embodiment, only one imaging device 238 is illustrated. In other embodiments, the apparatus 116 includes at least two of the imaging devices 238. For example, a first imaging device 238 generates image data 254 of the driver seat 124, the passenger seat 128, the center console 136, and the cup holders 188; and a second imaging device 238 generates image data 254 of the rear seats 132. A vehicle 100 with three rows of seating may include a third imaging device 238 to generate image data 254 of the third row seats (not shown). The image data 254 generated by each of the imaging devices 238 is stored as the image data 254.

The transceiver 246, which is also referred to as a wireless transmitter and receiver, is configured to wirelessly transmit data from the vehicle 104 to another electronic device and to wirelessly receive data from another electronic device via the Internet 112, for example. An exemplary electronic device with which the transceiver 246 communicates electronically is a transceiver 292 of the base station 108. Thus, the transceiver 246 operably connects the vehicle 104 to the Internet 112 and to other electronic devices, such as the base station 108. In other embodiments, the transceiver 246 sends and receives data using a cellular network, a wireless local area network ("Wi-Fi"), a personal area network, and/or any other wireless network. Accordingly, the transceiver 246 is compatible with any desired wireless communication standard or protocol including, but not limited to, Near Field Communication ("NFC"), IEEE 802.11, IEEE 802.15.1 ("Bluetooth®"), Global System for Mobiles ("GSM"), and Code Division Multiple Access ("CDMA").

The controller 250 is configured to execute program instruction data 258 in order to operate the apparatus 116. The controller 250 is provided as at least one microcontroller and/or microprocessor.

The memory 242 is an electronic storage device that is configured to store at least the image data 254, the program instruction data 258, interior segment data 268, occlusion metric data 272, weighting scale data 276, weighted occlusion metric data 278, cleanliness score data 280, and hazardous condition data 284. The memory 242 is also referred to herein as a non-transient computer readable medium.

The apparatus 116 further includes a battery 288 operably connected to at least the visible light source 230, the IR light source 234, the imaging device 238, the memory 242, the transceiver 246, and the controller 250 in order to supply electrical energy thereto. The battery 288 is rechargeable and may be provided as a lithium-based battery or any other battery type. Additionally or alternatively the apparatus 116 receives electrical power from a powers system of the vehicle 104.

The base station 108 of the system 100 includes a transceiver 292 and a memory 296 operably connected to a computer system 298. The transceiver 292 of the base station 108 is substantially the same as the transceiver 246 of the apparatus 116. In particular, the transceiver 292, which is also referred to as a wireless transmitter and receiver, is configured to wirelessly transmit data from the base station 108 to another electronic device and to wirelessly receive data from another electronic device via the Internet 112, for example. An exemplary electronic device with which the transceiver 292 communicates electronically is the transceiver 246 of the apparatus 116. Thus, the transceiver 292 operably connects the base station 108 to the Internet 112 and to other electronic devices, such as the apparatus 116. In other embodiments, the transceiver 292 sends and receives data using a cellular network, a wireless local area network ("Wi-Fi"), a personal area network, and/or any other wireless network. Accordingly, the transceiver 292 is compatible with any desired wireless communication standard or protocol including, but not limited to, Near Field Communication ("NFC"), IEEE 802.11, IEEE 802.15.1 ("Bluetooth®"), Global System for Mobiles ("GSM"), and Code Division Multiple Access ("CDMA").

The memory 296 of the base station 108 is an electronic storage device that is configured to store at least tracked score data 302, change data 306, and availability data 310. The memory 296 is also referred to herein as a non-transient computer readable medium.

The computer system 298 of the base station 108 is, for example, a personal computer that is operably connected to the Internet 112 via the transceiver 292 to receive electronic data from the apparatus 116. The computer system 298 may include a monitor to render data and to enable an operator of the computer system 298 to implement changes to a fleet of the vehicles 104. For example, the computer system 298 enables an operator to identify the vehicle 104 as being "in service," to identify the vehicle 104 as being "out of service," and to identify the vehicle 104 as scheduled for cleaning.

With reference again to FIG. 2, the data stored in the memory 242 is described. The controller 250 processes the image data 254 generated by the imaging device 238 to generate the segment data 268. The segment data 268 includes portions of the image data 254 corresponding to a plurality of interior segments 318, 322, 326, 330, 334, 338 of the cabin 120. For example, the segment data 268 includes driver seat segment data 268 that includes image data 254 corresponding to a driver seat segment 318 that includes the driver seat 124, passenger seat segment data 268 corresponding to a passenger seat segment 322 that includes the passenger seat 128, rear seat segment data 268 corresponding to a rear seat segment 326 that includes the rear seat 132, console segment data 268 corresponding to a console segment 330 that includes the center console 136, driver floor segment data 268 corresponding to a driver floor segment 334 that includes the driver floor 140, and passenger floor segment data 268 corresponding to a passenger floor segment 338 that includes the passenger floor 144. The segment data 268 include most and/or all regions of the cabin 120 in which a user may contact the vehicle 104 and most and/or all of the regions of the vehicle 104 that the user may touch with their hands.

In one embodiment, the segment data 268 includes cup holder segment data 268 that includes image data 254 corresponding to a cup holder segment 340 that includes the cup holders 188. In embodiments including the cup holder segment 340, the cup holder segment 340 is excluded from the console segment 330. In embodiments not including the cup holder segment 340, image data 254 of the cup holders 188 are included in the console segment 330. Inclusion of the cup holders 188 in the segment data 268 is beneficial because the cup holders 188 are often a disposal point for trash and other non-vehicle elements 344 left behind in the cabin 120.

The segment data 268 is generated by the controller 250 of the apparatus 116 based on the image data 254 using computer vision and image processing techniques. For example, in one embodiment, the controller 250 uses a semantic segmentation approach in which each pixel of the image data 254 is processed and provided with a class label corresponding to one of the interior segments 318, 322, 326, 330, 334, 338. A neural network may be used by the controller 250 to perform the semantic segmentation on the image data 254.

The apparatus 116 is configured to identify accurately the location, size, and configuration of the segments 318, 322, 326, 330, 334, 338 for each position of the movable elements of the vehicle 104. For example, the driver seat 124 is movable to a forward-most position and a rearmost position of the seat bottom 164, and the seat back 168 is tiltable from an upright position to a fully reclined position. For each position of the driver seat 124, the controller 250 is configured to identify the image data 254 corresponding to the driver seat segment 318 and to store the image data 254 as the segment data 268. The controller 250 is similarly configured to identify the locations of the segments 318, 322, 326, 330, 334, 338 for each other moveable element of the vehicle 104 including the passenger seat 128. Moreover, the controller 250 is configured to determine the location, size, and configuration of the driver floor segment 334 and the passenger floor segment 338 in response to movements of the seat bottom 164 and the seat bottom 172 respectively.

The occlusion metric data 272 is generated by the controller 250 of the apparatus 116 based on the image data 254. The occlusion metric data 272 is an exemplary metric for developing the scores of the cleanliness score data 280. Exemplary occlusion metric data 272 is plotted in FIG. 4 over an approximately thirty-five day period. To generate the occlusion metric data 272, the controller 250 processes the segment data 268 to identify pixels of the segment data 268 that correspond to the vehicle 104 and to identify pixels of the segment data 268 that correspond to non-vehicle elements 344 (FIGS. 2, 5B, and 5C). A ratio or percentage of the non-vehicle element pixels to the vehicle pixels is saved as the occlusion metric data 272 for that segment 318, 322, 326, 330, 334, 338. The occlusion metric data 272 represents a percentage or ratio of a corresponding interior segment that is occluded by a non-vehicle element 344. The term "occluded" is used because the non-vehicle element 344 occludes, conceals, obscures, blocks, or otherwise changes the appearance of a portion of the vehicle 104, as imaged by the imaging device 238. A high value of the occlusion metric data 272 corresponds to a "dirty" cabin 120 that is occluded with non-vehicle elements 344, and a low value of the occlusion metric data 272 corresponds to a "clean" cabin 120 that is less occluded or is not occluded with non-vehicle element 344. In other embodiments, the apparatus 116 uses any other metric for determining the cleanliness of the vehicle 104 by processing the segment data 268 and/or the image data 254 directly. Moreover, multiple metrics may be combined to arrive at the occlusion metric data 272.

As used herein, the term non-vehicle element 344 includes any object or substance that is not the vehicle 104. Exemplary non-vehicle elements 344 include cell phones, headphones, clothing, jewelry, computer devices, toys, money, eyeglasses, food, trash, wrappers, cups, bottles, straws, guns, knives, weapons, syringes, drug paraphernalia, pills, broken glass. Moreover, non-vehicle elements 344 also liquids, grease, dust, dirt, ash, snow, and bodily fluids, which may exhibit themselves in the image data 254 as stains or discolorations appearing on surfaces of the vehicle 104.

In FIG. 5A, the controller 250 has identified pixels of the image data 254 that correspond to the driver seat segment 318 and are saved as the segment data 268. Moreover, the controller 250 has processed the segment data 268 of the driver seat segment 318 to determine that all of the pixels correspond to vehicle 104 and that none of the pixels correspond to non-vehicle elements 344. As such, in FIG. 5A, the occlusion metric data 272 of the driver seat segment is 0%, because no portion of the vehicle 104 is occluded in FIG. 5A by a non-vehicle element 344. Whereas, in FIG. 5B the controller 250 has processed the segment data 268 of the driver seat segment 318 to determine that some of the pixels correspond to the vehicle 104 and that other pixels correspond to the non-vehicle element 344, such as a folder, a wallet, a purse, trash, or a sheet of paper. The controller 250 divides the portion of the segment data 268 corresponding to the non-vehicle element 344 by the portion of the segment data 268 corresponding to the vehicle 104 to arrive at an occlusion metric of 5% in FIG. 5B. In FIG. 5C a different non-vehicle element 344 is included and represents a liquid stain or articles of clothing left of the driver seat 124 that have discolored the driver seat 124 as detected by the controller 250 processing the segment data 268. In FIG. 5C, even more of the segment 318 is occluded by the non-vehicle elements 344 and the occlusion metric is calculated by the controller to be 40%.

Figure 4:
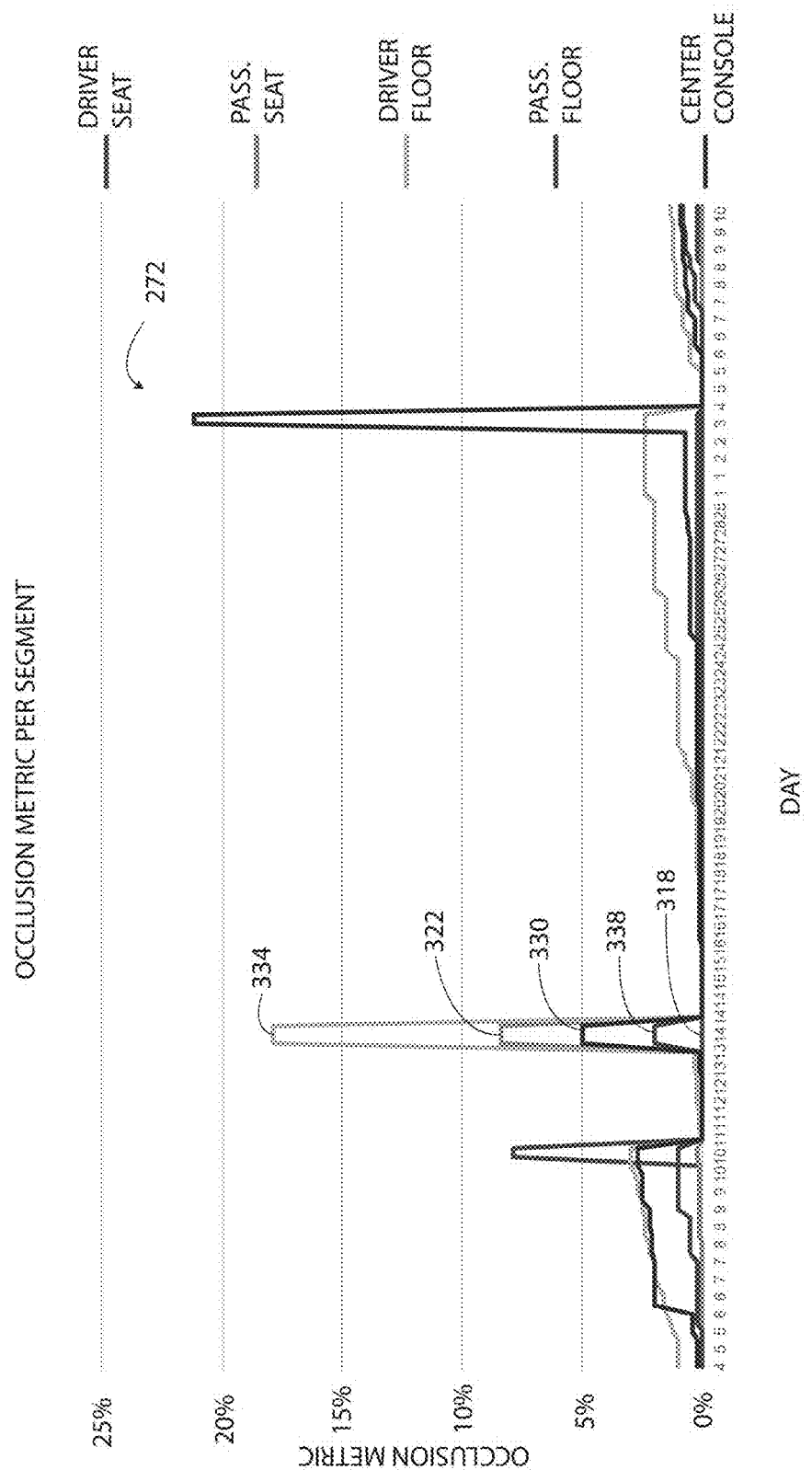
FIG. 4 is a plot of occlusion metric data generated by the system of FIG. 1.
Figure 5:
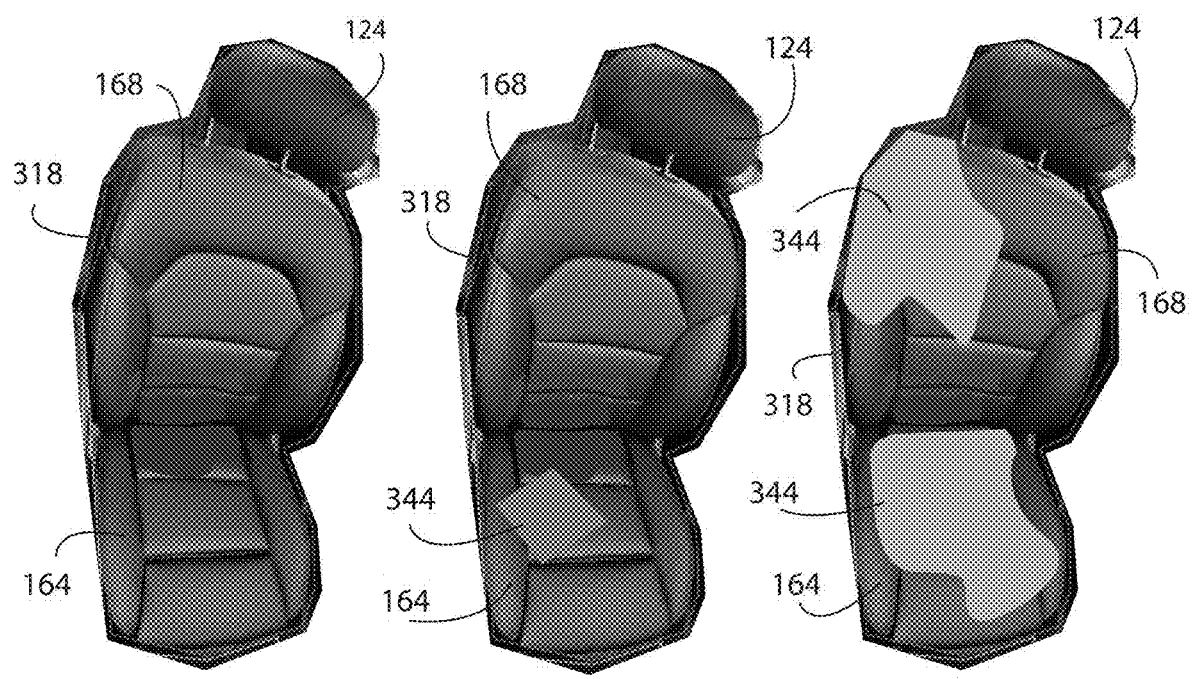
FIG. 5A depicts a driver seat and a driver seat segment of the vehicle of FIG. 1 absent of any non-vehicle elements.
FIG. 5B depicts the driver seat and the driver seat segment of the vehicle of FIG. 1 including a first non-vehicle element.
FIG. 5C depicts the driver seat and the driver seat segment of the vehicle of FIG. 1 including multiple non-vehicle elements.

In FIG. 4, the occlusion metric data 272 for the five exemplary segments 318, 322, 326, 330, 334, 338 of FIG. 2 is plotted. On day 14, for example, the occlusion metric data 272 indicates that the driver floor segment 334 is approximately 18% occluded, the passenger seat segment 322 is approximately 8.5% occluded, the center console segment 330 is approximately 5% occluded, and the passenger floor segment 338 is approximately 3% occluded. The driver seat segment 318 is approximately unoccluded (i.e. 0% occluded). Later on at day 14 in FIG. 4, the cabin 120 is cleaned and the occlusion metric data 272 indicates that the segments 318, 322, 326, 330, 334, 338 are 0% occluded as would be expected in a clean vehicle 104 that is free from non-vehicle elements 344.

In some embodiments, the controller 250 is configured to weight the occlusion metric data 272 according to the weighting scale data 276. Exemplary weighted occlusion metric data 278 is plotted in FIG. 6. The weighted occlusion metric data 278 is weighted, in one embodiment, based on a relative importance of the segment 318, 322, 326, 330, 334, 338 to the user experience. For example, most users prefer contact areas of the vehicle 104 that are clean to the touch, and are accepting of some uncleanliness in parts of the vehicle 104 that do not require physical contact. The following weighting scale data 276 is based on this approach and includes the following weighting for each segment 318, 322, 326, 330, 334, 338, driver seat 30%, passenger seat 25%, driver floor 10%, passenger floor 10%, center console 15%, and rear seat 10%. At day 14 in FIG. 6, the weighted values include driver seat segment 318 weighted 0 (0*0.30), passenger seat segment 322 weighted 2.1 (8.5*0.25), driver floor segment 334 weighted 1.8 (18*0.10), passenger floor segment 338 weighted 0.3 (3*0.1), and center console segment 330 weighted 0.75 (5*0.15). It is noted that the weights and percentages provided herein are exemplary only and may be adjusted based on customer and/or vehicle requirements.

The weighting scale data 276 weights most heavily the occlusion data 272 based on the driver seat segment 318 because the user will contact that portion of the vehicle 104. If the driver seat 124 is particularly unclean, the user may not even accept the shared vehicle 104 for usage. The occlusion data 272 based on the rear seat segment 326 is weighted lightly because unless the user is planning to transport backseat passengers, the user is unlikely to contact the rear seat 132.

The weighted occlusion metric data 278, in one embodiment, includes a plurality of "scores" and is also referred to herein as "score data." The weighted occlusion metric data 278, therefore, includes scores corresponding to each of the segments 318, 322, 326, 330, 334, 338. The exemplary scores in FIG. 6 at day 14 include the driver seat segment 318 having a score of 0, the passenger seat segment 322 having a score of 2.1, the driver floor segment 334 having a score of 1.8, the passenger floor segment 338 having a score of 0.3, and the center console segment 330 having a score of 0.75.

Figure 6:
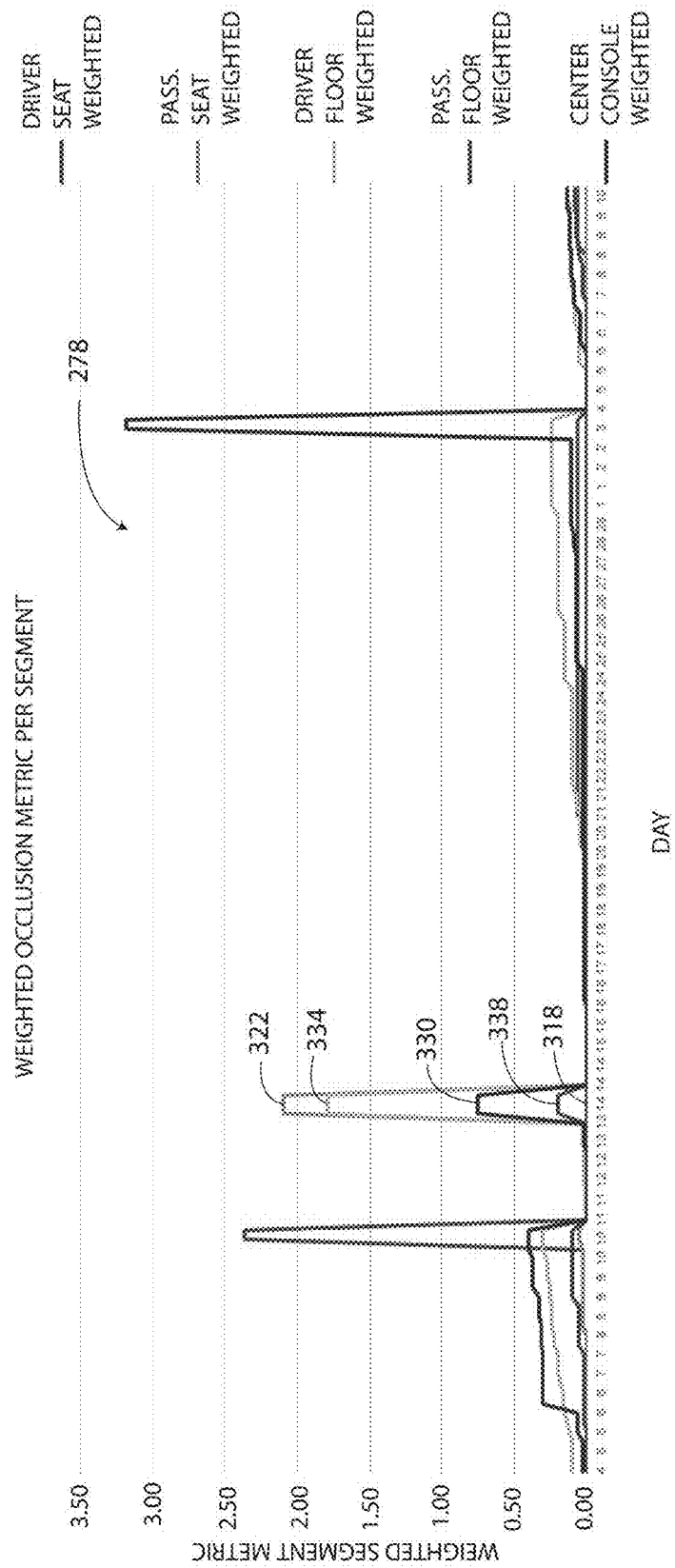
FIG. 6 is a plot of weighted occlusion metric data as generated by the system of FIG. 1.

Considering again day 14 in FIG. 6, after the occlusion metric data 272 is weighted according to the weighting scale data 276, the resulting weighted occlusion metric data 278 have resulted in prioritization of the passenger seat segment 322 over the driver floor segment 334. Such is evidenced by the peak of the weighted occlusion metric data 278 that corresponds to the passenger seat segment 322 being higher than the peak of the weighted occlusion metric data 278 that corresponds to the driver floor segment 334 in FIG. 6. The driver of the vehicle 104 is more likely to touch the passenger seat 128 with their hands than to touch the driver floor 140 with their hands, thus the weighting scale data 276 takes this into account to improve the user experience.

The values of weighting scale data 276 are fully adjustable and configurable by the apparatus 116 and/or the base station 108. In particular, in at least one embodiment, the weighting scale data 276 are seasonally and regionally adjusted. For example, in the winter months in northern climates (i.e. a seasonal time period), it is common for the driver floor 140 and the passenger floor 144 to become stained with salt, mud, and snow. Whereas, in the summer months (i.e. another seasonal time period), the driver floor 140 and the passenger floor 144 typically remain clean and/or are typically less dirty. The apparatus 116 and/or the base station 108 are configured to apply a lower weighting to the driver floor 140 and the passenger floor 144 in the winter months than in the summer months in order to deprioritize the importance of a clean driver floor 140 and a clean passenger floor 144 in the winter months. This is because users are more accepting of a snow and salt covered driver floor 140 in the wintertime than a dirty driver floor 140 in the summertime. In one embodiment, in the summer months, the driver floor segment 334 is weighted at 15% and the passenger floor segment 338 is weighted at 12%, and in the winter months the driver floor segment 334 is weighted at 10% and the passenger floor segment 338 is weighted at 8%.

The weighting scale data 276 are also adjustable and configurable based on the number of users occupying the vehicle 104. For example, when vehicle 104 is used by only a driver, the apparatus 116 prioritizes or weights the driver seat segment 318 at 30% and the passenger seat segment 322 at 20%. The passenger seat segment 322 is lower than the driver seat segment 318 because no user is occupying the passenger seat 128. Whereas, when the driver seat 124 and the passenger seat 128 are both occupied, the apparatus 116 prioritizes the driver seat at 30% and the passenger seat at 30% since both are being occupied and are in contact with the users. The same approach is used to increase the weighting of the rear seat segment 326 when a rear seat passenger is present in the rear seat 132.

In a further embodiment, the weighting scale data 276 are updated and adjusted based on customer feedback data. For example, when a user concludes a ride using the vehicle 104, the user provides feedback to indicate if the vehicle 104 was sufficiently clean. In one embodiment, the feedback is provided through an "app" or application operating on the user's phone. The app may ask the user to rate the cleanliness of each segment 318, 322, 326, 330, 334, 338 on a scale of one to five, for example. If users regularly provide a low score to the passenger seat segment 322, then the weighting scale data 276 of the passenger seat segment 322 may be increased to prioritize higher the cleanliness of the passenger seat 128 based on the customer feedback. Whereas, if users regularly provide a high score to the rear seat segment 326, then the weighting scale data 276 of the rear seat segment 326 may be decreased to deprioritize the cleanliness of the rear seat in favor of other segments 318, 322, 330, 334, 338 of the vehicle 104.

Figure 7:
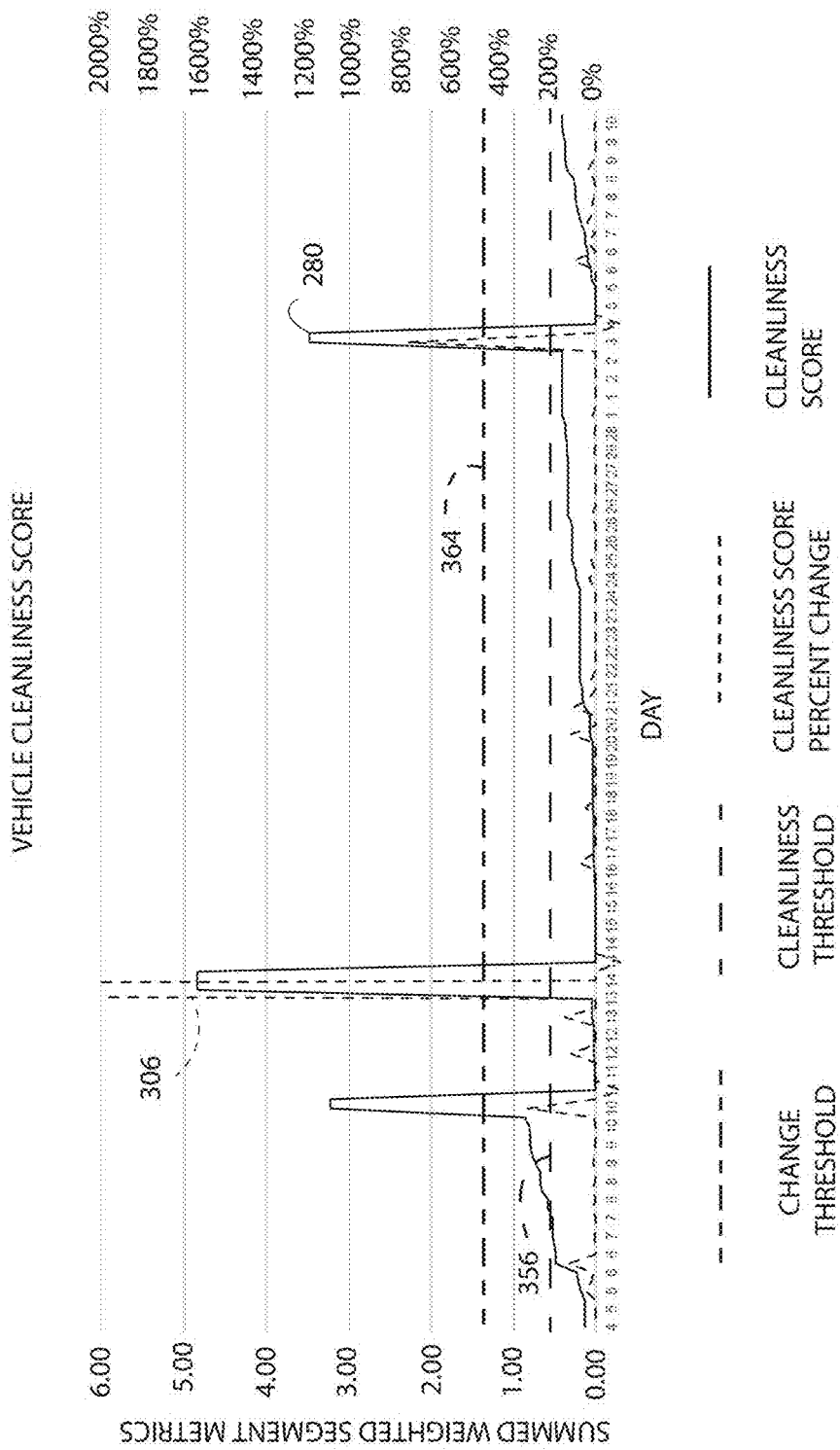
FIG. 7 is a plot of tracked cleanliness score data and change data as generated by the system of FIG. 1.

With reference to FIG. 7, the controller 250 generates the vehicle cleanliness score data 280 based on a combination of the weighted occlusion metric data 278. In particular, the "scores" for each segment 318, 322, 326, 330, 334, 338 of the weighted occlusion metric data 278 are combined (i.e. summed, in one embodiment) to arrive at a single numerical value that is representative of an overall vehicle cleanliness score of the cabin 120 and is stored as the cleanliness score data 280. For example, considering day 14 again, the cleanliness score data 280 is 4.95 (2.1+1.8+0.75+0.3+0.0). A higher score in the cleanliness score data 280 corresponds to a dirtier vehicle 104 and a lower score in the cleanliness score data 280 corresponds to a cleaner vehicle 104. When the vehicle 104 is completely clean, the corresponding cleanliness score data 280 is equal to 0.0.

In one embodiment, the daily cleanliness score data 280 is generated by controller 250 of the apparatus 116 and then transmitted to the base station 108 for long term storage as the tracked score data 302. Thus, the base station 108 tracks the cleanliness score data 280 over time. The tracked score data 302 includes the cleanliness score data 280 over a predetermined time period, such as one month or one year. The tracked score data 302 may also include the image data 254 and the segment data 268 for each corresponding score of the score data 280.

As shown in FIG. 7, in one embodiment, the computer system 298 of the base station 108 compares the cleanliness score data 280 to a cleanliness threshold 356. The cleanliness threshold 356, for example, represents a level of cleanliness/uncleanliness at or above which the vehicle 104 may be removed from service for cleaning. In FIG. 7, when the cleanliness score is below the cleanliness threshold 356, cleaning of the vehicle 104 is not scheduled because the vehicle 104 is relatively clean, and when the cleanliness score is at or above the cleanliness threshold 356 cleaning of the vehicle 104 is scheduled. The cleaning may be performed on the same day that it is scheduled or shortly thereafter.

The level of the cleanliness threshold 356 is adjustable based on the season and the region in which the vehicle 104 is operated. For example, as noted above, in the winter months in northern climates it is common for the driver floor 140 and the passenger floor 144 to become stained with salt, mud, and snow. Whereas, in the summer months, the driver floor 140 and the passenger floor 144 typically remain clean and/or are typically less dirty. The cleanliness threshold 356 may be increased in the winter months to account for increased likelihood that the vehicle 104 will become dirty from weather-related events. Moreover, instead, of increasing the cleanliness threshold 356 for the entire winter season, the cleanliness threshold 356 may be increased based on a weather forecast in a particular region of the country or of a state. For example, if it is forecasted that a winter storm will hit a particular region, vehicles 104 operating in that region may be evaluated with a cleanliness threshold 356 that is greater than a cleanliness threshold 356 used to evaluate vehicles 104 operating outside of the region forecasted to receive the winter storm.

Additionally, the cleanliness threshold 356 is adjustable based on the region of the country or state in which the vehicle 104 is typically operated. For example, users of the vehicle 104 in an urban environment may be accustomed to a higher level of uncleanliness that suburban and rural uses would not tolerate. Accordingly, the base station 108 may set the cleanliness threshold 356 higher for vehicles 104 operating in an urban environment as compared to the cleanliness threshold 356 for vehicles 104 operating in a suburban or rural environment.

The level of the cleanliness threshold 356 can be set based on any other factor, including the relative preferences of users in one city as compared to the preferences of users in another city. For example, it may be determined that users of the vehicle 104 in a first city are accepting of a greater level of uncleanliness than the users of the vehicle 104 in a second city. The cleanliness threshold 356 may be adjusted for each city differently and independently.

The base station 108 processes the tracked score data 302 to generate the change data 306 and the availability data 310. Exemplary change data 306 is plotted in FIG. 7 and is a percentage change of the cleanliness score data 280 compared to at least one previous cleanliness score data 280. Typically, each use or service run of the vehicle 104 results in a data point of the cleanliness score data 280, which is why there are multiple cleanliness scores for some days in FIG. 7. The change data 306 represents the percent change in the vehicle cleanliness score from one user to the next user or from one vehicle usage to the next vehicle usage by the same customer. For example, the cleanliness score data 380 for five consecutive usages of the vehicle 104 is 0.10, 0.15, 1.20, 1.25, and 2.0. The change data 306 beginning after the second use is 50% ((0.15-0.10)/0.10), 700% ((1.20-0.15)/0.15), 4% ((1.25-1.20)/1.20), and 60% ((2.0-1.25)/1.25) respectively.

The change data 306 is useful for determining the usage events of the vehicle 104 that have resulted in significant additional uncleanliness within the cabin 120. In most respects, it is assumed that the vehicle 104 will become gradually unclean as shown by the cleanliness score data 280 in FIG. 7 from days 4 to 9. After each use in days 4 to 9, a small increase in uncleanliness (i.e. more occlusion) occurs and is expected, and the change data 306 for days 4 to 9 is relatively flat. At day 10, however, the cleanliness score data 280 spikes about 2.5 points and results in a corresponding spike in the change data 306. If desired, a user of the vehicle 104 at day 10 may be identified by the base station 108 and the user may be assessed a charged for significantly dirtying the vehicle 104, as detected automatically by the system 100.

In one embodiment, the change data 306 is compared to a change threshold 364. Increases in the change data 306 above the change threshold 364 indicate that the user has greatly contributed to the dirtiness of the cabin 120 of the vehicle 104, whereas when the change data 306 is positive and below the change threshold 364, the user has only marginally increased the dirtiness of the cabin 120. When the change data 306 is negative, it is an indication that the user has cleaned the cabin 120 by removing non-vehicle elements 344 from the cabin 120, for example.

The availability data 310, as generated by the computer system 298, corresponds to the availability of the vehicle 104 for providing shared-vehicle services, for example. When the vehicle 104 is not being cleaned or serviced, the vehicle 104 is identified as available to provide shared-vehicle service in the availability data 310. When the vehicle 104 is being cleaned or serviced, the vehicle 104 is identified as unavailable to provide shared-vehicle service in the available data 310. The available data 310 enables a mobility service provider to quickly determine the status of the vehicle 104 as available or unavailable for shared-vehicle services.

With reference again to FIG. 1, the apparatus 116, in some embodiments, generates the hazardous condition data 284 based on the image data 254. In addition to processing the image data 254 for the generation of the occlusion data 272, the controller 250 also processes the image data 254 to detect the presence of any hazardous conditions present in the cabin 120. If a hazardous condition is detected by the apparatus 116, the corresponding image data 254 is saved as the hazardous condition data 284 and is uploaded or transmitted to the base station 108, which configures the available data 310 to identify the vehicle 104 as being "unavailable." As such, the system 100 prevents automatically users from coming into contact with a hazard automatically detected within the cabin 120.

The controller 250 uses object detection, image processing, and computer vision techniques to identify hazardous non-vehicle elements 344 including guns, knives, weapons, syringes, drug paraphernalia, and pills. Other identifiable hazardous non-vehicle elements 344 include changes to the cabin 120 such as cuts, scratches, scrapes, holes, and broken glass all of which change the appearance of the cabin 120 in the image data 254. Moreover, in some embodiments, the identifiable hazardous non-vehicle elements 344 include biological hazards, such as blood, vomit, urine, and feces. The hazardous condition data 284 are saved in the memory 242 and are transmitted to the base station 108 for processing. The availability data 310 are typically updated to identify the vehicle 104 as "unavailable" when the system 100 detects a hazardous non-vehicle element 344.

Figure 8:
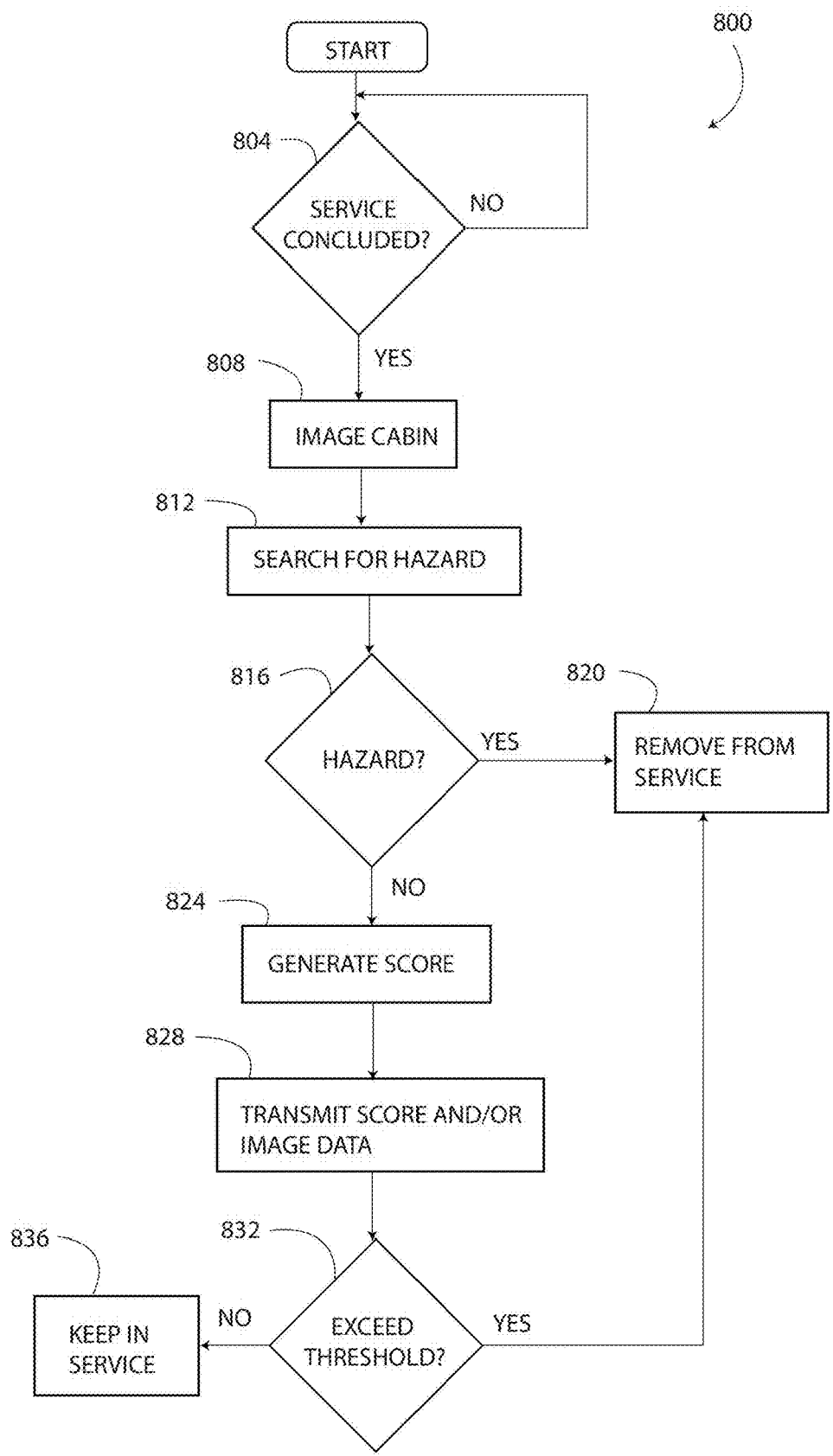
FIG. 8 is a flowchart depicting an exemplary method of operating the shared vehicle mobility system of FIG. 1.

With reference to FIG. 8, a method 800 of operating the system 100 is illustrated by the flowchart. The method 800 uses the apparatus 116 to detect automatically the cleanliness of the vehicle 104 and to update the availability data 310 accordingly. The method 800 is different from other methods that detect forgotten or left-behind articles within the cabin 120. Specifically, when users engage the service of a shared vehicle 104, some users return the vehicle 104 in the same condition with no trash and other non-vehicle elements 344 in the cabin 120, while other users leave the cabin 120 in a dirty state with many non-vehicle elements 344 in the cabin 120. The method 800 determines the extent of the non-vehicle elements 344 (i.e. typically trash and waste) present in the cabin 120 at the conclusion of a usage event of the vehicle 104. As such, the method 800 tends to ensure that the vehicle 104 is in an acceptably clean condition for the next user. The method 800 is described below in greater detail.

At block 804, the method 800 includes determining if the vehicle 104 has concluded a usage event. An exemplary usage event includes a user completing a one-way or a two-way trip with the vehicle 104, parking the vehicle 104, turning off the vehicle 104, and exiting the cabin 120. If the usage event is not concluded, then the method 800 loops back and continues to monitor if the usage event has concluded. When the apparatus 116 determines that the usage event is concluded, the method 800 moves to block 808. In one embodiment, the apparatus 116 determines that the usage event has ended by processing the image data 254 to determine that no person is located in the cabin 120. In other embodiments, the base station 108 sends an electric signal to the apparatus 116 to indicate that the usage event has ended and that the apparatus 116 should determine the cleanliness state of the cabin 120.

At block 808 of the method 800, the apparatus 116 is configured to image the cabin 120 of the vehicle 104 and to generate the image data 254. The image data 254 are stored to the memory 242 of the apparatus 116 and are representative of the state of the vehicle 104 as released by the user at the conclusion of the usage event. Essentially, at the end of each vehicle usage, the apparatus 116 "takes a picture" of the cabin 120 and stores the picture as the image data 254 in the memory 242. The image data 254 includes data for each interior segment 318, 322, 326, 330, 334, 338.

Next, at block 812, the controller 250 of the apparatus 116 is configured to process the image data 254 in search of any hazardous non-vehicle elements 344. As noted above, if a hazardous non-vehicle element 344 is identified, the controller 250 stores at least a portion of the image data 254 as the hazardous condition data 284.

At block 816 of the method 800, if the apparatus 116 identifies a potentially hazardous non-vehicle element 344, then at block 820 the vehicle 104 is removed from service. In particular, at block 820, the system 100 transmits the hazardous condition data 284 to the base station 108 using the transceivers 246, 292. When the base station 108 receives the transmitted hazardous condition data 284, the computer system 298 updates the availability data 310 to indicate that the vehicle 104 is unavailable for service, thereby preventing other users from encountering the hazardous or potentially hazardous non-vehicle element 344.

Moreover, at block 820, if the vehicle 104 is a fully autonomous vehicle (i.e. a level 5 autonomous vehicle), instructions are transmitted to the vehicle 104 to cause the vehicle 104 to drive itself to a safe location for the processing of the hazardous non-vehicle element 344. If the vehicle 104 is not a fully autonomous vehicle, a person may view a rendering of the hazardous condition data 284 using the computer system 298 and determine a proper course of action, such as (i) sending a representative to the vehicle 104 to dispose of the hazardous non-vehicle element 344, (ii) scheduling a cleaning event for the vehicle 104, (iii) dismissing the hazardous condition data 284 as a false positive and placing the vehicle 104 back in service by updating the availability data 310 accordingly.

At block 816 of the method 800, if hazardous non-vehicle elements 344 are not detected in the image data 254, then the apparatus 116 generates the cleanliness score data 280 and stores the cleanliness score data 280 in the memory 242.

Next, at block 828 the cleanliness score data 280 and the image data 254 are transmitted to the base station 108 for storage in the memory 296 and for further processing by the computer system 298. In particular, at block 832 the cleanliness score data 280 is compared to other cleanliness scores of the tracked score data 302, and the change data 306 is updated accordingly. If at block 832, computer system 298 determines that the cleanliness score data 280 is above the cleanliness threshold 356, then the vehicle 104 is removed from service or scheduled for removal from service, as identified at block 820. The vehicle 104 is removed from service, because the most recent cleanliness score of the cleanliness score data 280 indicates that the vehicle 104 has become unacceptably dirty and is unsuitable, in terms of cleanliness, for the next user. In one embodiment, when transitioning from block 832 to block 820, if the vehicle 104 is a fully autonomous vehicle 104, instructions are transmitted to the vehicle 104 to cause the vehicle 104 to drive itself to a location for cleaning and removal of the non-vehicle element(s) 344. If the vehicle 104 is not a fully autonomous vehicle, a person may view the corresponding image data 254 and determine a proper course of action, such as (i) sending a representative to the vehicle 104 to clean the cabin 120 and to remove the non-vehicle elements 344, (ii) scheduling a cleaning event for the vehicle 104, and (iii) dismissing the cleanliness score data 280 and the corresponding image data 254 as a false positive and placing the vehicle 104 back in service by updating the availability data 310 accordingly.

Moreover, at block 832, the computer system 298 processes the change data 306 to determine if a chargeback to the user is appropriate to cover the costs of cleaning the cabin 120. In particular, and with reference again to FIG. 7, it is assumed that normal usage of the vehicle 104 will result in a gradually dirty cabin 120. Exemplary cleanliness scores that represent the expected gradually dirty cabin 120 are shown at days 4 through 9 in FIG. 7. At day 8 in FIG. 7, the cleanliness score meets or exceeds the cleanliness threshold 356 and the system 100 determines that cleaning of the cabin 120 should be performed or scheduled. However, the change data 306 at day 8 indicates that the user barely added to the level of uncleanliness. As a result, the user of the vehicle 104 that pushed the cleanliness score over the cleanliness threshold 356 is not charged any additional cleaning fees or surcharges, because the user contributed to only a very small increase in the level of dirtiness of the cabin 120.

Considering again FIG. 7, at day 14 the change data 306 indicates that the user caused a massive increase (i.e. above 2000%) in the level of dirtiness of the cabin 120. At day 14, the cleanliness score data 280 is well above the cleanliness threshold 356 and the change data 306 is well above the change threshold 364. At day 14, the user single-handedly caused the cabin 120 to change from a "clean" condition to a "dirty" condition. As a result, the base station 108 may identify the user at day 14 and assess a cleaning charge against the user for causing an unexpected and unacceptable level of dirtiness to the cabin 120. Additionally, at day 14 the base station 108 may schedule a cleaning of the cabin 120 to prepare the vehicle 104 for service again.

While most users dirty the cabin 120 to some extent, some users clean the cabin 120 at the conclusion of a usage event. The base station 108 is configured to identify when a user cleans the cabin 120 through the detection of negative change data 306. Negative change data 306 indicates that the cabin 120 is cleaner (i.e. has fewer occlusions) at the end of the usage event than at the beginning of the usage event. When the base station 108 detects that the user has cleaned the cabin 120, the user may be identified to receive a benefit, such as a discounted cost for using the vehicle 104.

If at block 832, the computer system 298 determines that the cleanliness score data 280 does not exceed the cleanliness threshold 356, then the method 800 moves to block 836 and the vehicle 104 is kept in service. The availability data 310 at block 836 may be updated or checked to ensure that the vehicle 104 is identified as being available and ready for further usage events with a clean cabin 120.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method of operating a vehicle including a cabin having a plurality of interior segments, the method comprising:

generating image data for each interior segment of the plurality of interior segments with an imaging device located within the cabin;

processing the generated image data to generate score data including a plurality of scores with a controller operably connected to the imaging device, each score of the plurality of scores corresponding to one of the interior segments of the plurality of interior segments;

combining the generated scores into a single vehicle cleanliness score;

generating percent change data based on a percent change of the single vehicle cleanliness score compared to a previous vehicle cleanliness score of the vehicle;

generating availability data indicating if the vehicle is available or unavailable based on (i) a comparison of the single vehicle cleanliness score to a cleanliness threshold, and/or (ii) the percent change data; and removing the vehicle from service when the availability data indicates that the vehicle is unavailable.

2. A method of operating a vehicle including a cabin having a plurality of interior segments, the method comprising:

generating image data for each interior segment of the plurality of interior segments with an imaging device located within the cabin;

processing the generated image data to generate score data including a plurality of scores with a controller operably connected to the imaging device, each score of the plurality of scores corresponding to one of the interior segments of the plurality of interior segments;

combining the generated scores into a single vehicle cleanliness score;

generating availability data indicating if the vehicle is available or unavailable based on a comparison of the cleanliness score to a cleanliness threshold; and removing the vehicle from service when the availability data indicates that the vehicle is unavailable, wherein processing the generated image data to generate the plurality of scores comprises:

determining an occlusion metric for each interior segment of the plurality of interior segments to generate a plurality of occlusion metrics; and converting each of the occlusion metrics to a corresponding score of the plurality of scores, wherein each occlusion metric of the plurality of occlusion metrics is a percentage of the corresponding interior segment that is occluded by a non-vehicle element.

3. The method as claimed in claim 2, wherein converting each of the occlusion metrics to a corresponding score comprises:

weighting each occlusion metric according to a weighting scale.

4. The method as claimed in claim 3, wherein:

the plurality of interior segments includes at least a driver seat segment, a passenger seat segment, a driver floor segment, a passenger floor segment, a center console segment, and a rear seat segment, and the weighting scale applies the following weights to the plurality of interior segments the driver seat segment is weighted at 30%,
the passenger seat segment is weighted at 25%,
the driver floor segment is weighted at 10%,
the passenger floor segment is weighted at 10%,
the center console segment is weighted at 15%, and
the rear seat segment is weighted at 10%.

5. The method as claimed in claim 3, wherein the weighting scale is a first weighting scale, and converting each of the occlusion metrics to a corresponding score comprises:

weighting each occlusion metric according to the first weighting scale during a first seasonal time period, and
weighting each occlusion metric according to a second weighting scale during a second seasonal time period that is different than the first seasonal time period.

6. The method as claimed in claim 5, wherein:

the plurality of interior segments includes at least a driver seat segment, a passenger seat segment, a driver floor segment, a passenger floor segment, a center console segment, and a rear seat segment, the first weighting scale applies the following weights to the plurality of interior segments
the driver seat segment is weighted at 30%,
the passenger seat segment is weighted at 25%,
the driver floor segment is weighted at 10%,
the passenger floor segment is weighted at 10%,
the center console segment is weighted at 15%, and
the rear seat segment is weighted at 10%, and the second weighting scale applies the following weights to the plurality of interior segments
the driver seat segment is weighted at 40%,
the passenger seat segment is weighted at 30%,
the driver floor segment is weighted at 5%,
the passenger floor segment is weighted at 5%,
the center console segment is weighted at 15%, and
the rear seat segment is weighted at 5%.

7. The method as claimed in claim 1, wherein:

the previous vehicle cleanliness score is associated with a first user,
the single vehicle cleanliness score is associated with a second user, and
the method further comprises assessing a penalty to the second user when the percent change data exceeds a percent change threshold.

8. The method as claimed in claim 2, further comprising:

processing the generated image data to generate to hazardous item data corresponding to hazardous items in the cabin, removing the vehicle from service based on the hazardous item data.

9. An apparatus for monitoring a cabin of a vehicle, the cabin including a plurality of interior segments, the apparatus comprising:

an imaging device located within the cabin and configured to generate image data for each interior segment of the plurality of interior segments;

a controller operably connected to the imaging device and configured to:

process the generated image data to generate score data including a plurality of scores, each score of the plurality of scores corresponding to one of the interior segments of the plurality of interior segments, combine the generated scores into a single vehicle cleanliness score, generate availability data indicating if the vehicle is available or unavailable based on a comparison of the cleanliness score to a cleanliness threshold, and remove the vehicle from shared vehicle service when the availability data indicates that the vehicle is unavailable, wherein processing the generated image data to generate the score data includes (i) determining an occlusion metric for each interior segment of the plurality of interior segments to arrive at a plurality of occlusion metrics, and (ii) converting each of the occlusion metrics to a corresponding score of the plurality of scores by weighting each occlusion metric of the plurality of scores according to a weighting scale, and wherein each of the occlusion metrics is a percentage of the corresponding interior segment that is occluded by a non-vehicle element.

10. The apparatus as claimed in claim 9, further comprising:

a housing located within a compartment of the cabin, wherein the imaging device and the controller are located within the housing.

11. The apparatus as claimed in claim 10, wherein the compartment is located in an overhead console of the vehicle.

12. The apparatus as claimed in claim 9, further comprising:
- at least one visible lighting device operably connected to the controller and configured to illuminate the cabin with light in the visible spectrum; and
- an infrared lighting device operably connected to the controller and configured to illuminate the cabin with light in the infrared spectrum.

13. The apparatus as claimed in claim 9, wherein the controller and imaging device are electrically isolated from an electrical system of the vehicle.

14. The system as claimed in claim 9, further comprising:
- a transceiver operably connected to the controller and configured to transmit wirelessly at least the availability data to a remote base station.

\* \* \* \* \*